(12) United States Patent
Welke et al.

(10) Patent No.: US 11,995,239 B2
(45) Date of Patent: May 28, 2024

(54) DISPLAY ELEMENT HAVING VARIABLE DAMPING

(71) Applicant: Harman Becker Automotive Systems GmbH, Karlsbad (DE)

(72) Inventors: Joerg Welke, Ettlingen-Schoellbronn (DE); Peter Brandt, Pfinztal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 17/869,209

(22) Filed: Jul. 20, 2022

(65) Prior Publication Data

US 2023/0027798 A1 Jan. 26, 2023

(30) Foreign Application Priority Data

Jul. 21, 2021 (DE) ...................... 10 2021 118 887.3

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
None
See application file for complete search history.

(56) References Cited

U.S. PATENT DOCUMENTS

| 10,146,309 B2 * | 12/2018 | Tissot ..................... B60K 37/06 |
| 11,009,959 B1 * | 5/2021 | Piazza ................ G02B 27/0172 |
| 2002/0149561 A1 * | 10/2002 | Fukumoto ........... G06F 3/04886 345/156 |
| 2010/0214242 A1 * | 8/2010 | Casiez .................... G06F 3/038 345/173 |
| 2019/0385420 A1 | 12/2019 | Khoshkava et al. |

FOREIGN PATENT DOCUMENTS

CN 109132208 A 1/2019

OTHER PUBLICATIONS

German Search Report dated Jan. 26, 2022 for German Patent Application No. 102021118887.3, 10 pages.

* cited by examiner

*Primary Examiner* — Matthew Yeung
(74) *Attorney, Agent, or Firm* — Brooks Kushman P.C.

(57) ABSTRACT

A display unit comprising a touch surface touchable by a user, a drive unit for moving the touch surface when the touch surface is touched, in particular for haptic feedback to the user, and at least one damping element, which damps mechanical oscillations of the movement of the touch surface. Each damping element comprises an elastic element and a pressure setting element (for example, a valve). This pressure setting element is designed to fill the elastic element in a variable or settable manner with gas for the damping. The damping properties of the display unit can thus be set arbitrarily via the gas pressure inside the elastic element.

19 Claims, 4 Drawing Sheets

DISPLAY ELEMENT HAVING VARIABLE DAMPING

CROSS-REFERENCE TO RELATED APPLICATIONS

This application claims priority to DE application Serial No. 10 2021 118 887.3 filed Jul. 21, 2021, the disclosure of which is hereby incorporated in its entirety by reference herein.

TECHNICAL AREA

The present embodiments relate to a display element having a touch surface, which has a damping element, the damping of which can be set variably.

BACKGROUND

In many applications, for example, in game consoles, mobile telephones, and automobiles, touch-sensitive display screens (touch displays) or other input elements having surfaces provided to be touched (touch surfaces) are used, in which a haptic (tactile) feedback is provided after a corresponding touch by the user. This haptic feedback takes place, for example, by movement of the touch surface, for example, by shaking or vibrating. A drive unit ensures this movement, which is mechanically coupled in a suitable way to the touch surface to transmit vibrations generated by the drive unit to the touch surface. Such a drive unit can be controlled, for example, by an electronic control unit in dependence on a detected touch of the touch surface. Such a drive system can comprise, for example, a piezoactuator.

Such a display element having haptic feedback has a certain noise development due to the drive unit, which is to be kept as low as possible. In addition, the haptic feedback is to take place as uniformly as possible over the entire touch surface

SUMMARY

Since both the noise development and also the uniformity of the haptic feedback over the entire touch surface are dependent on the damping properties of the damping element of the display element, the present embodiment has the object of making the damping of the damping element variable or settable.

In the scope of the present embodiment, a display unit is provided, which comprises a touch surface touchable by a user, a drive unit for moving the touch surface upon a touch of the touch surface by a user, and at least one damping element, which damps mechanical oscillations of the movement of the touch surface. Each of the one or the multiple damping elements comprises an elastic element and a pressure setting element. A pressure setting element is understood here as an element which is designed to fill the elastic element variably with a gas in order to thus provide the elastic element in particular a damping property defined in dependence on the set gas pressure.

In that the elastic element is variably filled with gas with that of the pressure setting element, the elasticity of the elastic element can advantageously be controlled or set arbitrarily via the gas pressure. The elasticity and damping properties of the damping element or elements can thus in turn be set variably or arbitrarily. This in turn has the advantage that the elasticity and damping properties of the display unit can be set in such a way that, on the one hand, the noise development of the display unit is minimal and, on the other hand, the haptic feedback induced by the drive unit is distributed as uniformly as possible over the entire surface. The present embodiment thus achieves the object stated above.

In addition, a so-called temperature problem can also be solved by the present embodiment, that the elasticity and damping properties of the damping element or elements are also dependent on the temperature, so that the above-described problems (noise development, uniformity of the haptic feedback) occur more strongly at certain temperatures. According to the embodiment, by way of a corresponding setting of the gas pressure, the elasticity and damping properties of the damping element or elements can also be optimally matched with a specific temperature.

In addition, the damping properties of the damping element can be set according to the embodiment on the basis of the gas pressure within the elastic element in such a way that a resonance frequency of the display unit can be set (for example to an optimum).

In summary, the perceptible quality of the display unit, which is significantly influenced by the haptic feedback, is improved by the present embodiment.

The present embodiment provides a simple possibility for making the elasticity and/or damping properties of the elastic element settable, particularly for the production of the display unit. In that, for example, the tube is correspondingly filled, for example, via a valve with gas (usually air), also during the production of the display unit, the elasticity and/or damping properties of the elastic element are determined on the basis of the gas pressure prevailing after the filling in the tube. Presuming this gas pressure (and further environmental conditions, for example, the temperature) remain constant during the operation of the display unit, the elasticity and/or damping properties of the elastic element also remain at the values set during the production. In this embodiment, the manner in which the gas pressure is filled and set may advantageously produce the display unit, so that arbitrarily many elastic elements can be filled using these same aspects. In particular, these aspects may not then be part of the display unit during the operation of the respective display unit.

However, it is also possible according to the embodiment that the display unit actively controls the gas pressure inside the tube. In such an embodiment, the display unit comprises a controller and gas pressure changing mechanism for changing the gas pressure in the tube. These gas pressure changing mechanism can comprise, for example, a pump and the corresponding valve, using which the gas pressure can be raised and lowered. In this embodiment, the gas pressure can accordingly be changed arbitrarily during the operation (and not only during the production) of the display unit, to thus change the elasticity and/or damping properties of the elastic element. The gas pressure can thus be changed in dependence on measured values (for example temperature) detected by a sensor, to thus keep the elasticity and/or damping properties of the elastic element constant even in changing conditions (for example temperature).

In addition, it is possible in the embodiment outlined above having the controller and the gas pressure changing mechanism that the display unit comprises a sensor, using which an acceleration of the touch surface and thus a force acting on the touch surface is detectable. The display unit can then, by the gas pressure changing mechanism, set the gas pressure (and thus the elasticity and/or damping properties of the elastic element) in dependence on the acceleration detected by the sensor.

In the scope of the present embodiment, a vehicle is also provided which comprises a display unit as described above.

BRIEF DESCRIPTION OF THE DRAWINGS

The present embodiments are described in detail hereinafter with reference to the figures.

DETAILED DESCRIPTION

Figure 1:
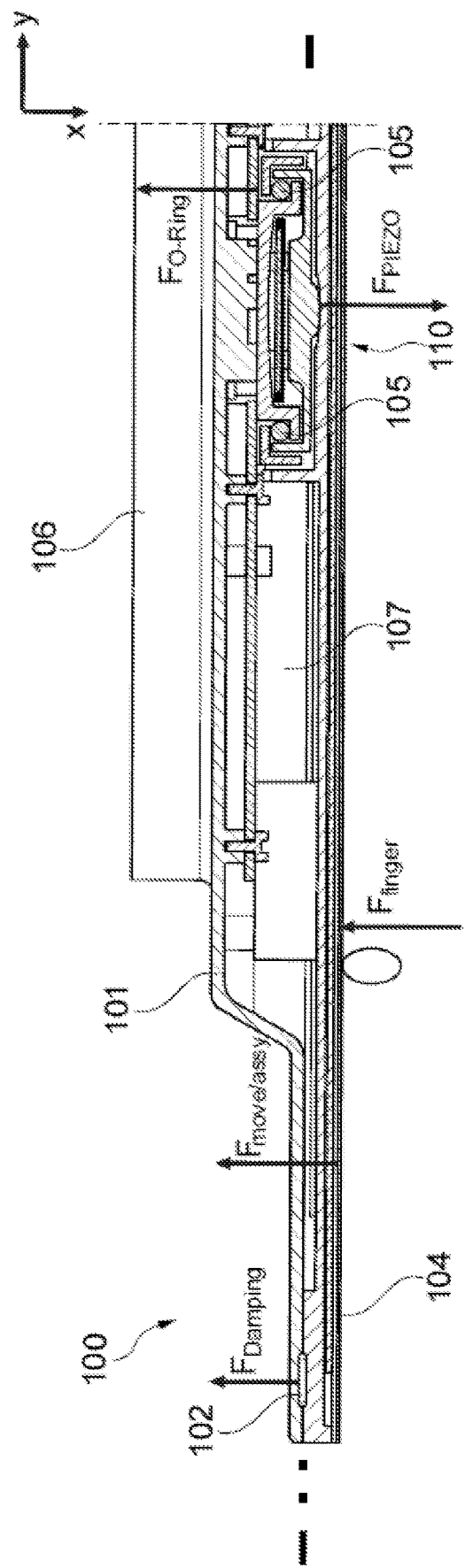
FIG. 1 shows a display unit according to one embodiment with the acting forces in cross section.

FIG. 1 shows a display unit 100 according to one embodiment together with forces acting on this display unit 100. The display unit 100 is fastened using a rear side 101 on a fixed base 106. A touchscreen or a touch surface 104 of the display unit 100 is located on the front side of the display unit 100 or on the side of the display unit 100 opposite to the rear side 101. A drive unit 110 is arranged in the middle of the display unit 100, the structure of which is described in more detail by way of example in FIG. 3 and which ensures a haptic feedback. A movable unit of the display unit 100 is identified by the reference sign 107. A tube 105 is arranged as an elastic element inside the drive unit 110, and a tube 102 is also arranged as an elastic element at the edge of the drive unit 100.

In general, a force $F_{finger}$, which is usually caused by the finger of the user, acts on the display unit 100 when the user presses on an element displayed on the touch surface 104, in general for operation. On the other hand, the force $F_{Piezo}$, which is generated as haptic feedback for the user by the drive unit 110, usually in reaction to the force $F_{finger}$, acts on the display unit 100. In addition, the forces $F_{Damping}$ and $F_{O-Ring}$ from the tube 102 or tube 105, respectively, and the force $F_{move-assy}$ as the weight force of the movable unit 107 act on the drive unit 100.

Following equation 1 applies to the forces shown in FIG. 1.

$$F_{piezo} = F_{O-Ring} + F_{Damping} + F_{move-assy} + F_{finger} \quad (1)$$

The force $F_{Damping}$ or $F_{O-Ring}$ caused by the tube 102 or tube 105, respectively, is substantially determined here by the gas pressure prevailing in the tube 102 or 105.

Figure 2:
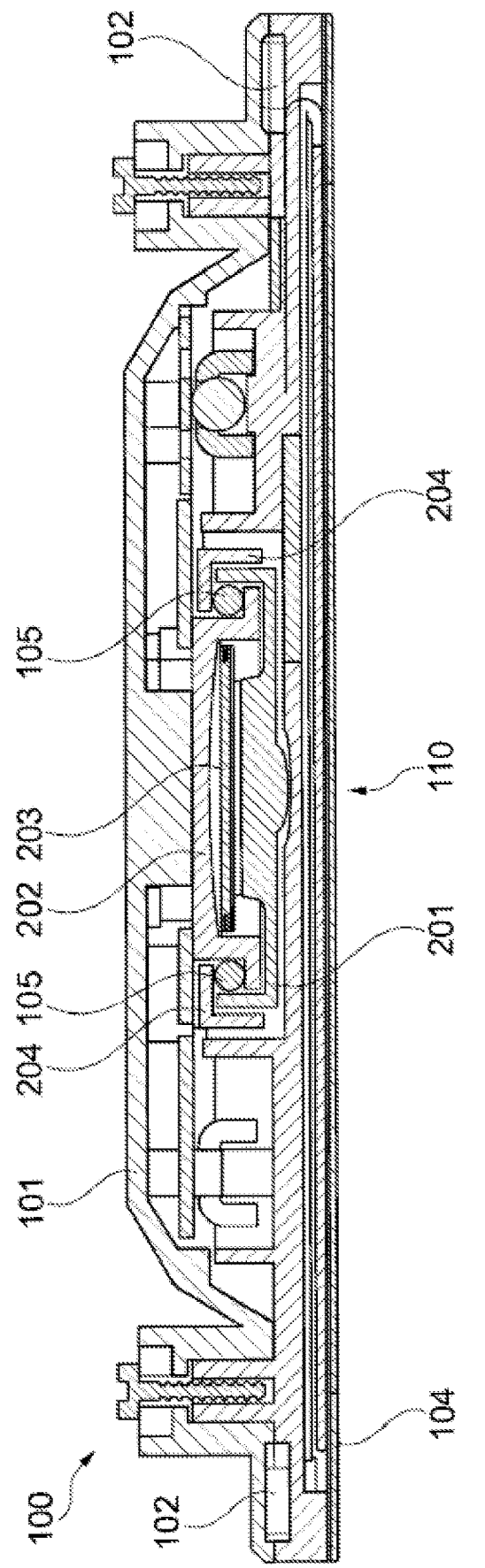
FIG. 2 shows the display unit according to one embodiment shown in FIG. 1 in cross section with more details.

In FIG. 2, the display unit 100 also shown in FIG. 1 is shown with more details. It can be seen better in FIG. 2 that the drive unit 110 for generating the haptic feedback is located essentially in the middle of the display unit 100. The drive unit 110 comprises a first housing part 201 for mechanical coupling to the touch surface 104. A second housing part 202 of the drive unit 110 is mounted that floats in relation to the first housing part 201. A piezoelectric actuator or piezoactuator 203 is arranged between the first housing part 101 and the second housing part 202 and is mechanically coupled on one side to the first housing part 201 and on the opposite side to the second housing part 202. A housing carrier frame or third housing part 204 is mounted relative to the second housing part 202 with the elastic element or tube 105, which is arranged between the second housing part and the third housing part 204. The elastic element 105 permits the setting of the operating point of the second housing part 202 and thus of the piezoactuator 203 relative to the third housing part 204 by generating a restoring force in case of a compression of the elastic element 105 upon a corresponding deflection of the piezoactuator 203.

It can be seen well in FIG. 2 that the elastic element or the tube 2 is arranged at the edge and around the circumference of the display element 100.

Figure 3:
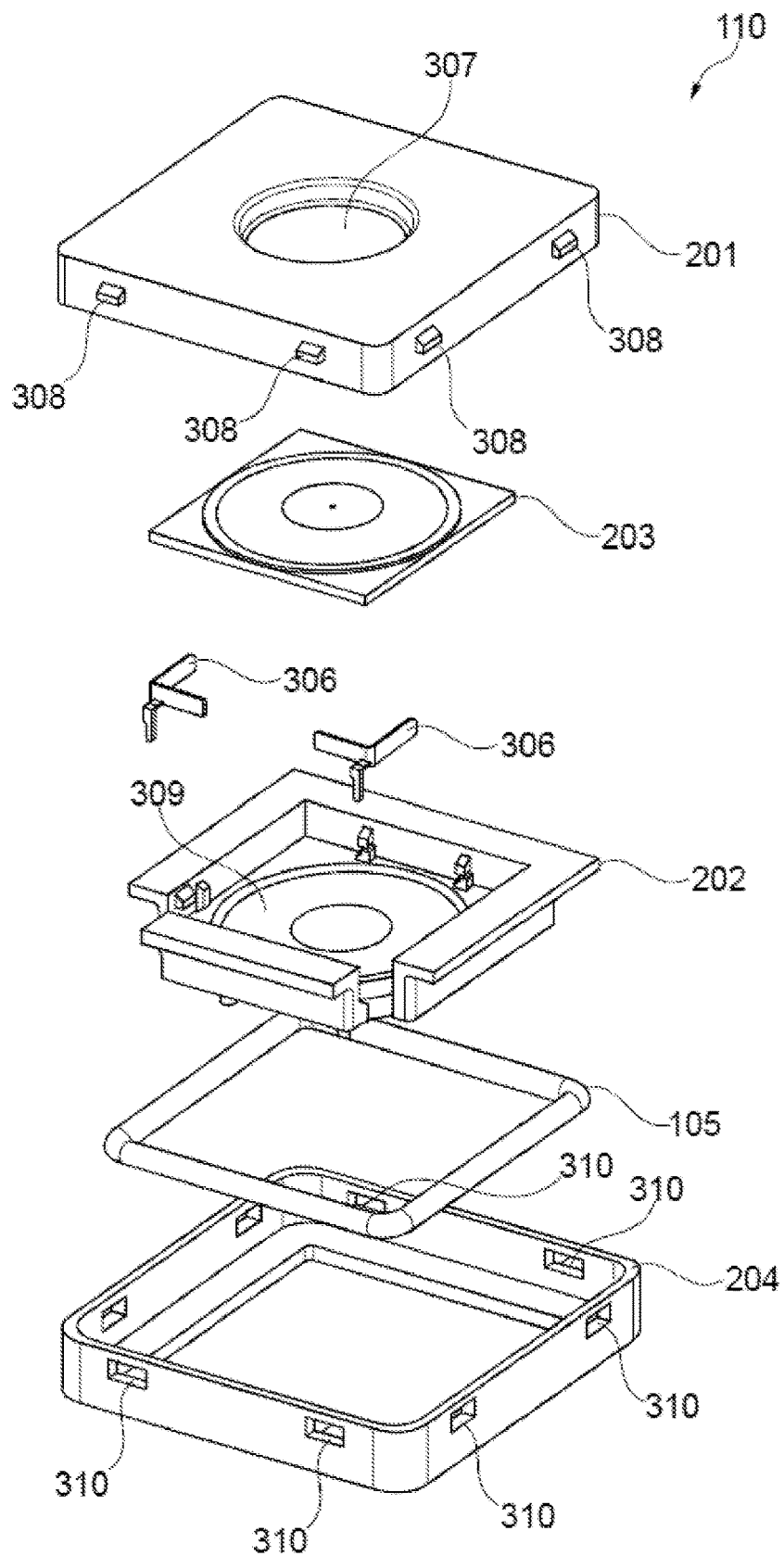
FIG. 3 is an exploded view of a drive unit of a display unit according to one embodiment.

An exploded view of the drive unit 110 is shown in FIG. 3. The first housing part 201 is made cup-shaped in the exemplary embodiment shown having a square footprint, wherein other footprint shapes, for example, rectangular shapes in general and also round and oval shapes can be used. The first housing part 201 has, for example, at the central position of its footprint, an inwardly oriented cup-shaped indentation 307 having a round footprint and outwardly oriented catch lugs 308 at the side walls. The first housing part 201 is arranged so that the outside of the footprint is used for the mechanical coupling to a plate-shaped element (not shown) of the touch surface 104 or for the mechanical coupling to the touch surface 104 itself and accordingly the cup shape of the first housing part 201 opens away from the plate-shaped element, which corresponds to downward position in the illustration of FIG. 3, wherein the plate-shaped element is coupled on the upper side of the first housing part 201. The cup-shaped formation of the three housing parts 201, 202, and 204 offers a sound-insulating encapsulation of the piezoactuator 203 in the assembled state.

The second housing part 202 is made essentially cup-shaped having a square footprint in the exemplary embodiment shown, corresponding to the first housing part 201, wherein the cup shape of the second housing part 202 opens toward the plate-shaped element, which accordingly entails upward in the illustration of FIG. 3. The second housing part 202 has side walls, which are bent over perpendicularly outward at the cup opening, and is dimensioned so that the second housing part 202 including bent-over side walls can be accommodated by the first housing part 201. The second housing part 202 has, for example, at the central position of the footprint, a round recess 309 oriented outward.

The piezoactuator 203 is dimensioned so that in the assembled state of the drive unit 110, on the one hand, the piezoactuator 203 rests in the recess 309 and, on the other hand, the piezoactuator 203 is in mechanical contact with the indentation 307 for the purpose of force transmission. The piezoactuator 103 can have multiple layers of piezoelectric material which are mechanically stacked and electrically connected in parallel in order to achieve greater movement amplitudes. In the exemplary embodiment shown, two contacting springs 106 are used for electrically contacting the piezoactuator 203, which can be led outward, for example, through openings in the second housing part 202 and in the third housing part 204.

The third housing part 204 is formed essentially cup-shaped having a square footprint in the exemplary embodiment shown, corresponding to the first housing part 201 and the second housing part 202, wherein the cup shape of the third housing part 204 opens toward the plate-shaped element, which again entails upward in the illustration of FIG. 3. The third housing part 204 has a large square opening in the footprint, so that an L-shaped wall cross section of the third housing part 104 results, and is designed so that it can accommodate the first housing part 201 together with the second housing part 202 introduced therein. Catch grooves 310 in the third housing part 204, which correspond to the catch lugs 308 of the first housing part 101 with respect to their position, ensure that after the engagement of the catch lugs 308 in the catch grooves 310, the three housing parts 102, 202, 204 are locked, wherein the elastic element 105, enclosing the second housing part 202, is arranged between the part of the second housing part 202 bent outward and the bottom of the third housing part 204, in order to elastically couple these two housing parts 202, 204 to one another.

The elastic element or the tube 105 is designed in the exemplary embodiment shown as a square O-ring having O-shaped (or other suitable cross section) made of elastic material such as rubber. This tube 105 is filled with air via a valve, for example, wherein the air pressure present in the tube 105 determines the elasticity or damping properties of the tube or elastic element 105. The tube 105 generates a restoring force upon corresponding compression by the piezoactuator 103, which as the compression subsides returns the second housing part 202 into its operating point with respect to the third housing part 204. The area which is enclosed by the tube 105 or which the tube surrounds is parallel to the piezoactuator 203 and thus parallel to the touch surface 104 here.

Figure 4:
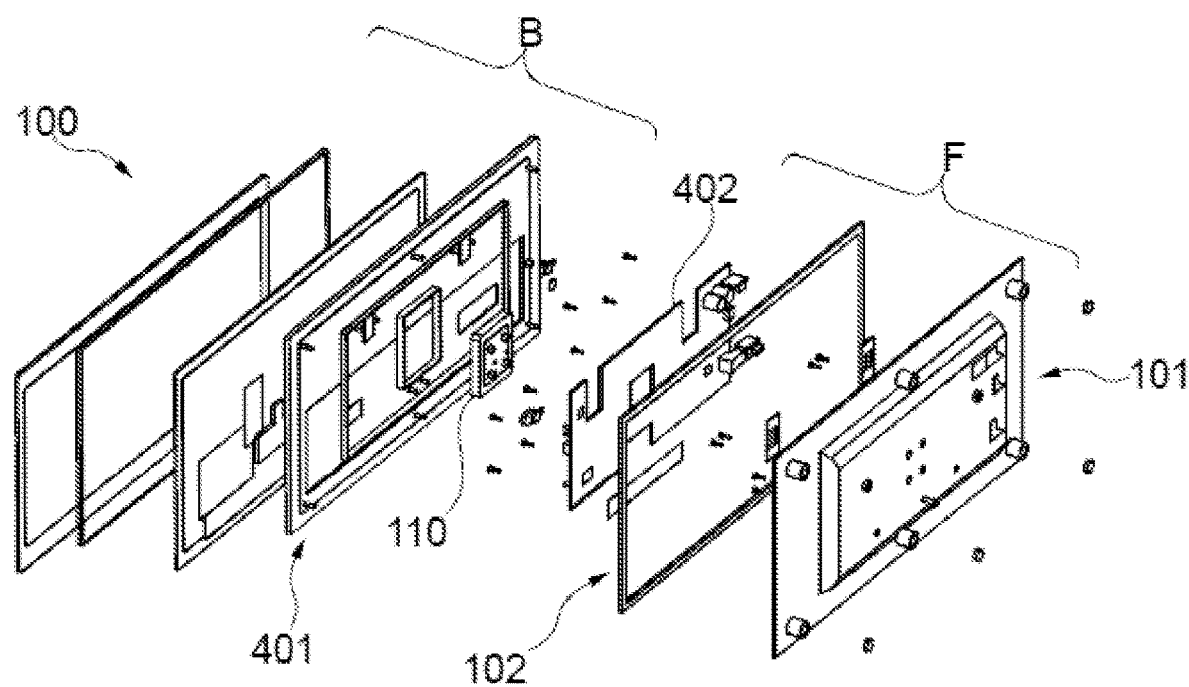
FIG. 4 is an exploded view of a display unit according to one embodiment.

FIG. 4 shows an exploded view of a display unit 100 according to one embodiment, which is divided into a movable part B and a fixed part F. While the movable part B is essentially formed by the touch surface, a display carrier 401, and the drive unit 110, the fixed part essentially comprises the rear side 101 and a control electronics unit 402. An elastic element or a tube 102, which is filled with air and has a self-contained shape, is arranged between the fixed part F (i.e., the rear side 101) and the movable part B for damping. The air pressure present in the tube 102 defines the elasticity or damping properties of the tube or elastic element 102. It may be seen that the tube 102 is arranged more or less around the rear side 101 at the edge of the display unit 100. The area enclosed by the tube 102 is arranged here in parallel to the rear side 101 and thus also in parallel to the touch surface 104.

In summary, the following may be stated:

The elastic element can be formed O-ring-shaped or can itself have the form of an O-ring. The cross section of the ring may have a circular, oval, or other suitable shape.

The elastic element can comprise a tube or can itself be a tube. The tube (similarly as in the case of a bicycle tube) can have a self-contained shape. The tube can be formed from rubber or TPU (thermoplastic polyurethane) or thermoplastic elastomers.

The tube can be arranged around an element of the display unit. An area which the tube encloses is in particular arranged in parallel to the touch surface.

A cross-sectional area of the tube (which is perpendicular to the area which the tube encloses) can be essentially equivalent over the length or the circumference of the tube. In particular, this cross-sectional area is essentially circular or oval, as was already mentioned above.

The pressure setting element can comprise a valve. This valve is designed to fill the elastic element with the gas via this valve. The pressure setting element can also comprise (in particular instead of the valve) a type of throttle valve, which only acts in one direction (i.e., the pressure setting element prevents gas from escaping from the elastic element).

The valve can either be a check valve, which essentially only prevents the gas from escaping from the elastic element or only permits the gas to flow into the elastic element. However, it is also possible that the valve is designed as a flow valve, which enables or controls both a flow of the gas into the elastic element and also a flow of the gas out of the elastic element.

While the pressure inside the elastic element can more or less only be raised using the check valve, the pressure inside the elastic element can be both raised and also lowered via the flow valve.

The drive unit can comprise a piezoactuator. The piezoactuator in particular generates a force which acts perpendicularly to the touch surface.

The gas with which the elastic element of the damping element is filled is in particular air. The use of air as the gas represents a very cost-effective and also environmentally friendly variant.

According to a first embodiment a damping element extends inside the drive unit, while in a second embodiment, a damping element extend outside the drive unit and damps the touch surface relative to a rear side of the display unit. Of course, it is contemplated that the display unit may include, in one embodiment, a damping element that extends inside the drive unit and in a second embodiment, a damping element that extends outside the drive unit. It is also possible that the display unit may include, in one embodiment, one or more damping elements inside the drive unit and in a second embodiment, one or more damping elements outside the drive unit.

In the first embodiment, the drive unit comprises a first housing part, a second housing part, an actuator (for example a piezoactuator), and a third housing part. The first housing part is mechanically coupled to the touch surface. The second housing part is mounted floating in relation to the first housing part. The actuator is mechanically coupled to the first housing part and the second housing part. The third housing part is mounted with the aid of the damping element according to one embodiment, wherein this damping element is located (directly) between the second housing part and the third housing part.

In this first embodiment, the damping element according one embodiment (more precisely: the elastic element of the damping element) generates a restoring force, which, after an actuation of the actuator, returns the second housing part into an operating point with respect to the third housing part (and thus the drive unit is returned as a whole into a neutral operating point).

In particular, the elastic element of the damping element used in the first embodiment is arranged around the second housing part. The elastic element thus advantageously extends more or less at the edge of the drive unit and encloses an area which lies essentially in parallel to the touch surface.

In the second embodiment, the display unit comprises a rear side, which is arranged more or less opposite to or on the other side of the touch surface arranged on a front side of the display unit. The damping element according to one embodiment is arranged between the touch surface and the rear side and extends at the edge of the display unit.

What is claimed is:

1. A display unit comprising:
a touch surface touchable by a user,
a drive unit for moving the touch surface when the touch surface is touched, and
at least one damping element, which dampens mechanical oscillations of the movement of the touch surface,
wherein the at least one damping element comprises an elastic element and a pressure setting element to variably fill the elastic element with gas for the damping, and
wherein the drive unit comprises:
a first housing part mechanically coupled to the touch surface, a second housing part mounted floating in relation to the first housing part, an actuator mechanically coupled to the first housing part and the second housing part, and a third housing part mounted by a first damping element of the at least one damping element and which is arranged between the second housing part and the third housing part.

2. The display unit of claim 1, wherein the elastic element is shaped in the form of an O-ring.

3. The display unit of claim 1, wherein the elastic element includes a tube having a self-contained shape.

4. The display unit of claim 3, wherein the tube is arranged around an element of the display unit, so that an area which the tube encloses is arranged in parallel to the touch surface.

5. The display unit of claim 1, wherein the pressure setting element comprises a valve to fill the elastic element with a gas.

6. The display unit of claim 2, further comprising a first valve that prevents the gas from escaping from the elastic element, or a second valve that enables a flow of the gas both into the elastic element and out of the elastic element.

7. The display unit of claim 1, wherein the drive unit comprises a piezo actuator.

8. The display unit of claim 1, wherein the gas is air.

9. The display unit of claim 1, wherein the elastic element encloses the second housing part.

10. The display unit of claim 1,
wherein the display unit comprises a rear side positioned opposite to the touch surface and arranged on a front side of the display unit, and
wherein the at least one damping element comprises a first damping element which is arranged between the touch surface on the rear side and extends inside the display unit at an edge of the display unit.

11. The display unit of claim 1 being positioned in a vehicle.

12. A display unit comprising:
a touch surface,
a drive unit for moving the touch surface in response to a user input being received at the touch surface, and
at least one damping element that dampens mechanical oscillations of the movement of the touch surface,
wherein the at least one damping element comprises an elastic element and a pressure setting element to variably fill the elastic element with gas to dampen the mechanical oscillations, and
wherein the drive unit comprises:
a first housing part mechanically coupled to the touch surface,
a second housing part mounted floating in relation to the first housing part,
an actuator mechanically coupled to the first housing part and the second housing part, and
a third housing part mounted by a first damping element of the at least one damping element and which is arranged between the second housing part and the third housing part.

13. The display unit of claim 12, wherein the elastic element is shaped in the form of an O-ring.

14. The display unit of claim 12, wherein the elastic element includes a tube having a self-contained shape.

15. The display unit of claim 14, wherein the tube is arranged around an element of the display unit, so that an area which the tube encloses is arranged in parallel to the touch surface.

16. The display unit of claim 12, wherein the pressure setting element comprises a valve to fill the elastic element with a gas.

17. The display unit of claim 12 further comprising a first valve that prevents the gas from escaping from the elastic element, or a second valve that enables a flow of the gas both into the elastic element and out of the elastic element.

18. The display unit of claim 12, wherein the drive unit comprises a piezo actuator.

19. A display unit comprising:
a touch surface being arranged to move in response to a user input,
a drive unit arranged to move the touch surface, and
at least one damping element that dampens mechanical oscillations of the movement of the touch surface,
wherein the at least one damping element comprises an elastic element and a pressure setting element to variably fill the elastic element with gas to dampen the mechanical oscillations, and
wherein the drive unit comprises:
a first housing part mechanically coupled to the touch surface,
a second housing part mounted floating in relation to the first housing part,
an actuator mechanically coupled to the first housing part and the second housing part, and
a third housing part mounted by a first damping element of the at least one damping element and which is arranged between the second housing part and the third housing part.

* * * * *